July 23, 1968   H. S. WOODHEAD   3,394,326
ELECTRO-MAGNETIC CONTACT-MAKING RELAYS
Filed Sept. 21, 1966   3 Sheets-Sheet 1

3,394,326
ELECTRO-MAGNETIC CONTACT-MAKING RELAYS

Harry Stanley Woodhead, London, England, assignor to International Standard Electric Corporation, New York, N.Y., a corporation of Delaware
Filed Sept. 21, 1966, Ser. No. 580,916
Claims priority, application Great Britain, Oct. 15, 1965, 43,817/65
15 Claims. (Cl. 335—106)

ABSTRACT OF THE DISCLOSURE

Relays for use as cross-point switches are provided. A plurality of contact pairs are supplied consisting of magnetic cores sealed through a wall of a common contact enclosure and magnetic contact leaves within the enclosure. The cores form part of a common magnetic circuit, their outer ends being joined by a magnetic yoke. The magnetic circuit is completed through a further wall of the contact enclosure and the device casing.

---

This invention relates to electromagnetic contact making relays.

According to the invention, such a relay includes two or pairs of co-operating contacts situated within an enclosure, one contact of each pair being formed by a magnetic core member sealed through a wall of the enclosure and the said core members forming part of a common magnetic circuit energization of which causes the second contact of each contact pair to make contact with the corresponding core member.

The wall through which the said cores are sealed preferably consists of a non-magnetic and electrically insulating material such as glass, the cores, the glass wall, and a metal rim embracing the periphery of the wall forming a multiple element glass-to-metal seal assembly.

The foregoing and other features of the invention will be evident from the following description of a preferred form of electromagnetic relay embodying the invention.

The description refers to the accompanying drawings in which.

Figure 1:
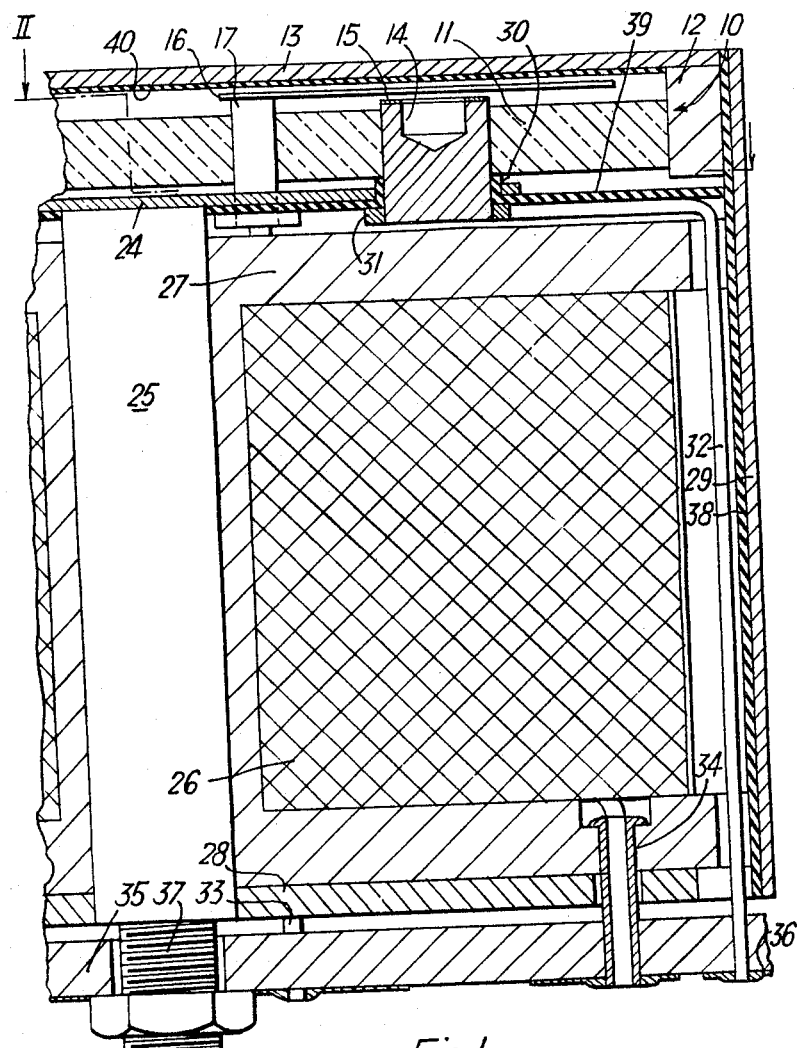
FIG. 1 shows a cross-section of the assembly on an axial plane.
Figure 2:
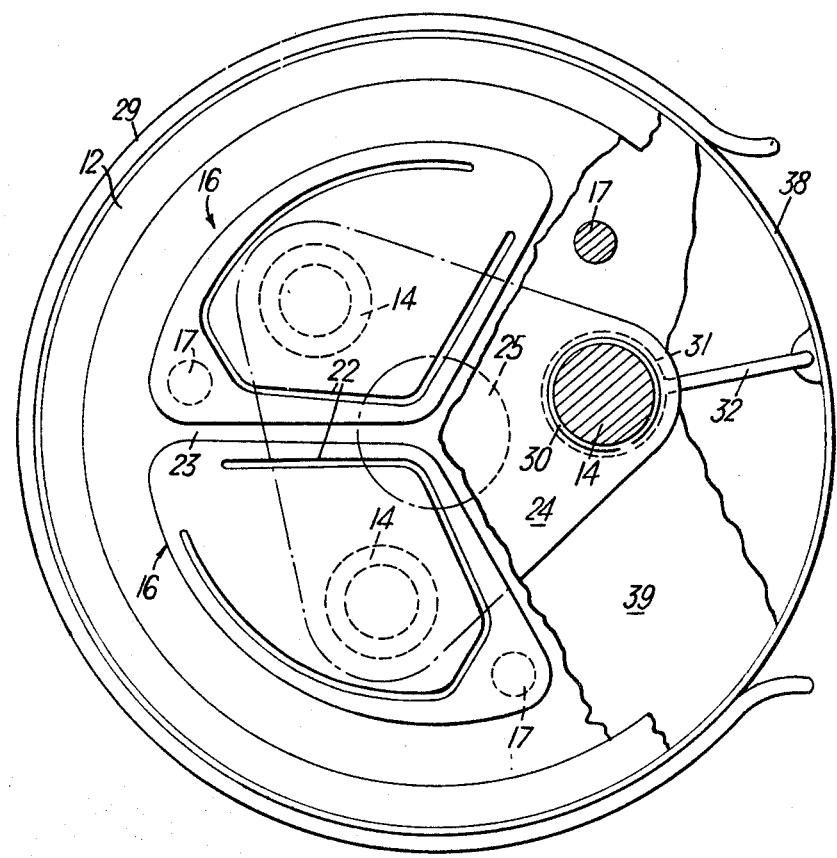
FIG. 2 shows an end view of the relay sectioned on the line marked II—II in FIG. 1, and FIGS. 3 and 4 show plan and side views respectively of a contact spring forming part of the relay.

The relay shown in the drawings can be considered to consist of two principal parts, a multiple-contact sealed switch assembly indicated generally at 10 in FIG. 1 and the associated external magnetic circuit and energizing coil.

The switch assembly 10 consists of a sealed enclosure built up from a glass-to-metal seal assembly comprising a flat circular glass wall 11 having sealed thereto a rim 12 of magnetic metal, and a closure plate 13 again of ferromagnetic metal which is soldered at its periphery to a face of the seal rim 12. The glass wall 11 of the assembly is provided with three core members 14 which are sealed through the wall and project from each face. The core members 14 are in the form of short lengths of ferromagnetic material and are counter-bored at their ends within the switch enclosure to provide a contact-making end surface 15 in the form of a flat annulus; this contact-making surface is provided with a layer of a noble contact metal such as palladium.

Figure 3:
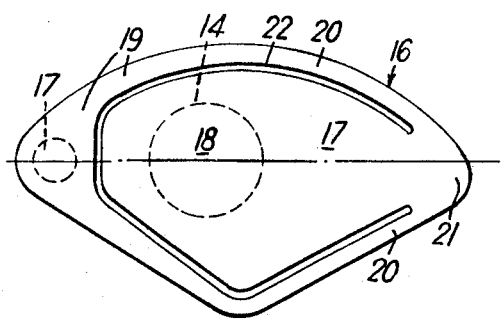
Figure 4:
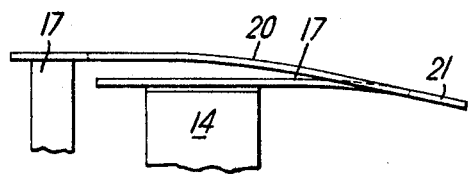

The co-operating contact associated with each of the cores 14 consists of a resilient contact spring 16 of ferromagnetic metal which is mounted within the enclosure by means of a support and terminal post 17 also sealed through the glass wall 11. The contact spring 16 is shaped as shown in FIG. 3 to provide a contact-making portion in the form of a tongue 17, having the contact-making area 18 near its free end, and a mounting portion 19 by which the contact spring is anchored to its mounting post 17. It will be seen that the mounting portion 19 consists of a pair of arms 20 embracing the contact-making tongue 17 and joining it at its root 21. The anchorage point 17, the contact-making area 18 and the junction 21 of the contact tongue with the mounting arms 20 are located in the same plane with the contact-making area between the other two points. It will be seen that when the contact tongue 17 is attracted towards the associated core 14 by the energization of the magnetic circuit of which both form part, the contact spring will tend to distort in opposite senses along its mounting arms 20 and along the contact tongue 17; a one-piece contact spring bending to bring its contact surface into contact with the core would rotate the plane of the contact surface and cause contact action to occur at a single point only of the meeting surfaces. With the contact arrangement shown this bending is effectively compensated by the bending in the opposite sense of the material forming the contact tongue 17. By this means the contact action can be made substantially parallel so that the entire contact surface is usefully employed. FIG. 4 of the drawings shows the approximate form adopted by the contact in the operated position.

The contact-making lower surface of the contact spring 16 is provided at least over that part of its area that engages the core 14 with a layer of suitable metal such as palladium.

It will be seen that each of the contact springs 16 is given the shape shown in FIG. 3 by cutting through the thickness of the spring along the line 22 to separate the contact tongue and the mounting arms 20. The relay comprises three independent spring sets, and since the contact spring 16 of each set lies in the same plane within the switch enclosure 10, a convenient way of making these contact springs consists in mounting a complete disc of suitable metal by means of the support posts 17 and subsequently separate it into three individual contact springs by cutting (for example by spark discharge machining) along the lines 23; a similar process is then employed to shape each contact by cutting along the lines 22.

The three contact pairs of the relay are arranged to be operated by the energization of a single magnetic circuit. A magnetic yoke member 24 forms a flux path joining all three of the cores 14 at the ends outside the switch enclosure, and a winding core 25 is attached to the side of the yoke member 24 remote from the switch assembly. The energizing winding 26 of the relay, on a suitable insulating bobbin 27, surrounds the core 25. A further yoke member 28 of magnetic material forms the lower end plate of the relay assembly and also forms part of the return flux path, this path being completed through a clip-on cover of magnetic metal 29. It will thus be seen that the magnetic flux path through the relay, starting in the winding core 25, branches through the contact cores 14 and passes through the co-operating contact springs 16 to the magnetic closure plate 13 of the switch assembly. The return flux path is effected through the outer rim member 12 of the switch assembly, the outer cover 29 of the relay and the lower closure plate 28. Energization of this flux path therefore causes the contact springs 16 to be urged towards and make contact with the contact-making end faces 15 of the cores 14, since in this position they provide a low reluctance flux path between the cores and the switch closure plate 13.

The electrical connections to the contact pairs can, of course, be varied in accordance with the particular application for which the relay is intended. In the relay shown, intended to be suitable for telephone cross-point switching arrangements, the contact pairs are electrically completely independent and insulated from the other structural components of the relay. Thus the contact cores 14 are electrically insulated by means of short insulating sleeves 30 from the associated magnetic yoke member 24, and have soldered to their outer ends a collar 31 formed in the end of a terminal lead 32 which emerges from the face of the relay assembly remote from the contacts. Similarly, the connection to the contact spring 16 of each pair is made through its mounting post 17, from which a terminal connection again emerges at 33 on the remote face of the relay assembly. The winding terminals are also brought out at 34 on the same face of the assembly. The relay is thus very suitable for mounting upon an insulating board 35 provided on the face remote from the relay with conductor tracks 36; the ends of the relay terminal leads can then pass through holes in the board 35 and can be soldered to the tracks 36. The relay may be mounted on the board 35 solely by its electrical connections, but it is preferred to adopt the arrangement shown in the drawing in which the end of the winding core 25 projects beyond the end of the relay assembly and forms a threaded mounting stud 37.

An insulating sleeve 38 is provided within the relay outer cover 29 to remove any risk of shorting the relay contact terminal leads 32 to the relay frame. A similar function is performed by a disc 39 of insulating material fitted over the contact cores 14. A further disc 40 of insulating material on the inner surface of the switch assembly closure member 13 prevents the accidental contact of the contact spring 16 with the closure member when in released position.

It is to be understood that the foregoing description of specific examples of this invention is made by way of example only and is not to be considered as a limitation on its scope.

What we claim is:

1. An electromagnetic contact making relay including two pairs of cooperating contacts situated within an enclosure, one contact of each pair being formed by a magnetic core member sealed through a wall of the enclosure, said core member forming part of a common magnetic circuit energization of which causes the second contact of each contact pair to make contact with the corresponding core member, said wall of the enclosure through which the said cores are sealed consisting of a non-magnetic and electrically insulating material, the magnetic circuit of the relay being completed through further wall portions of the enclosure, said further wall portions being of ferromagnetic metal, the said further wall portions of the enclosure including a wall portion in spaced parallel relationship with the wall through which the said cores are sealed, the movable contact of each contact pair including a resilient contact member capable of movement between a rest position and an energized position in which it makes contact with the associated core member, the reluctance of the magnetic path through the resilient contact member between the core member and the magnetic wall portion of the enclosure being least in the energization position of the contact, and each said movable contact member consisting of a resilient lamina of ferro-magnetic metal, 2. A relay according to claim 1 wherein the said lamina is shaped to provide a contact making portion and a mounting portion having an anchorage point within the enclosure, arranged so that the anchorage point, the contact making area and the junction between the contact making and mounting portions of the lamina are spaced in the plane of the lamina with the contact making area between the said anchorage point and the said junction.

3. A relay according to claim 2 wherein the said lamina is shaped to provide a contact making portion in the form of a tongue having the contact-making area near its free end, and a mounting portion having two arms embracing the said tongue and joined to it at its root.

4. A relay according to claim 2 wherein the anchorage point of the lamina is a metal post sealed through the same wall of the enclosure as the core members and providing an electrical connection to the lamina.

5. A relay according to claim 1 wherein at least the contact making area of the lamina has thereon a layer of a noble metal.

6. A relay according to claim 1 wherein the contact-making face of the said core member has the form of a plane annulus.

7. A relay according to claim 1 wherein the contact making face of each said core member has thereon a layer of a noble metal.

8. A relay according to claim 1 including an outer seal member of magnetic material embracing and sealed to the periphery of the enclosure wall through which the core members are sealed, the said outer seal member forming part of the magnetic circuit of the relay.

9. A relay according to claim 1 wherein the ends of the core members outside the enclosure are magnetically connected together by a yoke member.

10. A relay according to claim 9 wherein the common magnetic circuit of the relay includes a winding core member extending from the side of the yoke member remote from the contact of core members and surrounded by an energizing winding of the relay.

11. A relay according to claim 10 wherein the winding core member protrudes beyond the winding and provides mounting means for the relay.

12. A relay according to claim 10 including a magnetic cover embracing the winding and providing a flux return path in the magnetic circuit of the relay.

13. A relay according to claim 12 including a further magnetic yoke member completing the magnetic circuit between the protruding end of the winding core member and the cover.

14. A relay according to claim 9 wherein the core members are electrically insulated from the yoke member and are provided each with an independent electrical terminal.

15. A relay according to claim 14 wherein the material of the wall through which the core members are sealed is glass.

References Cited

UNITED STATES PATENTS 3,150,244 9/1964 Nitsch et al. _____ 335—196
3,324,432 6/1967 Ridler et al. _____ 335—154

BERNARD A. GILHEANY, *Primary Examiner.*

H. BROOME, *Assistant Examiner.*